United States Patent [19]

Chang et al.

[11] Patent Number: 4,603,942
[45] Date of Patent: Aug. 5, 1986

[54] FLEXIBLE, DIELECTRIC MILLIMETER WAVEGUIDE

[75] Inventors: Yu-Wen Chang, Rancho Palos Verdes; Phillip T. Kan, Fullerton; Oakley G. Ross, Upland, all of Calif.

[73] Assignee: General Dynamics, Pomona Division, Pomona, Calif.

[21] Appl. No.: 540,479

[22] Filed: Oct. 11, 1983

[51] Int. Cl.[4] .................................................. G02B 5/14
[52] U.S. Cl. ............................... 350/96.24; 333/241; 333/261; 350/96.10; 350/96.23
[58] Field of Search ............... 350/96.10, 96.20, 96.23, 350/96.24, 96.25, 96.26, 96.29, 96.30, 96.34; 333/239, 241, 280, 261

[56] References Cited

U.S. PATENT DOCUMENTS

| | | | |
|---|---|---|---|
| 1,751,584 | 3/1930 | Hansell | 358/901 |
| 2,187,908 | 1/1940 | McCreary | 358/901 |
| 2,479,288 | 8/1949 | Allen | 333/241 |
| 2,668,869 | 2/1954 | Iams | 333/162 |
| 2,897,461 | 7/1959 | Ashbaugh et al. | 333/248 |
| 3,267,932 | 11/1962 | Valliere | 358/901 |
| 3,556,635 | 1/1971 | Schrenk et al. | 350/96.24 |
| 3,659,234 | 4/1972 | Schuttloffel et al. | 333/95 A |
| 3,665,497 | 5/1972 | Deradorian et al. | 313/103 |
| 3,779,627 | 12/1973 | Pinnow et al. | 350/96.34 X |
| 3,808,494 | 4/1974 | Hayashi et al. | 313/103 |
| 4,181,397 | 1/1980 | Baker et al. | 350/96.20 |
| 4,412,192 | 10/1983 | Paolino | 333/261 X |
| 4,463,329 | 7/1984 | Suzuki | 333/239 |

FOREIGN PATENT DOCUMENTS 2433838 3/1980 France ................................. 333/241

OTHER PUBLICATIONS

Moorthy, "Flexible Dielectric Waveguide for MM Application . . . ", *Proc. of 6th Int. Conf. on IR and MM Waves* (Miami Beach), Dec. 1981, pp. W-4-6/1 and 2.

*Primary Examiner*—John Lee
*Attorney, Agent, or Firm*—Neil F. Martin; Edward B. Johnson

[57] ABSTRACT

A flexible waveguide for transmitting waves from a sensor mounted on a gimbal includes a cable comprising an outer flexible sheath and a plurality of flexible polytetrafluoroethylene fibers bundled within the sheath and including a termination flange coupled to at least one end thereof with the flange including a wedge-shaped plug and a tapered cavity engaging the end of the cable.

13 Claims, 3 Drawing Figures

FLEXIBLE, DIELECTRIC MILLIMETER WAVEGUIDE

BACKGROUND OF THE INVENTION

The present invention relates to waveguides and pertains particularly to a flexible waveguide.

Many sensing units are mounted on gimbals within airframes such as missiles and the like. The sensor must transmit waves from the seeker or sensing head to other data or information handling or utilizing equipment. It is essential that any device for transferring the waves from the gimbal-mounted seeker to the other equipment not interfere with the operation of the gimbal itself. Any unnecessary torque or force on the gimbal may cause it to drift appreciably, thereby interfering with the accuracy of the system. Very often the drift-rate requirement for a seeker gimbal is as low as 0.05 degrees per second in order to provide the necessary accuracy in the guidance system.

While one potential solution to this problem is to use a rate gyroscope to compensate for drift caused by the wave guides, space limitations make the mounting of a compensating gyro very difficult as well as adding more weight to the system. Moreover, such a solution can also result in restricting the look angle of the seeker.

The present invention was developed to satisfy the need in terms of size, weight and cost of guiding the millimeter waves from a gimbal mounted sensor. The present invention provides an improved flexible millimeter waveguide.

SUMMARY AND OBJECTS OF THE INVENTION

It is the primary object of the present invention to provide an improved, flexible millimeter waveguide.

In accordance with the primary aspect of the present invention, a millimeter waveguide comprises a cable of a plurality of flexible fibers of dielectric material encompassed within a flexible sheath with termination flanges for coupling the waveguide.

BRIEF DESCRIPTION OF THE DRAWINGS

The above and other objects and advantages of the present invention will become apparent from the following description when read in conjunction with the drawings wherein.

DETAILED DESCRIPTION OF A PREFERRED EMBODIMENT

Figure 1:
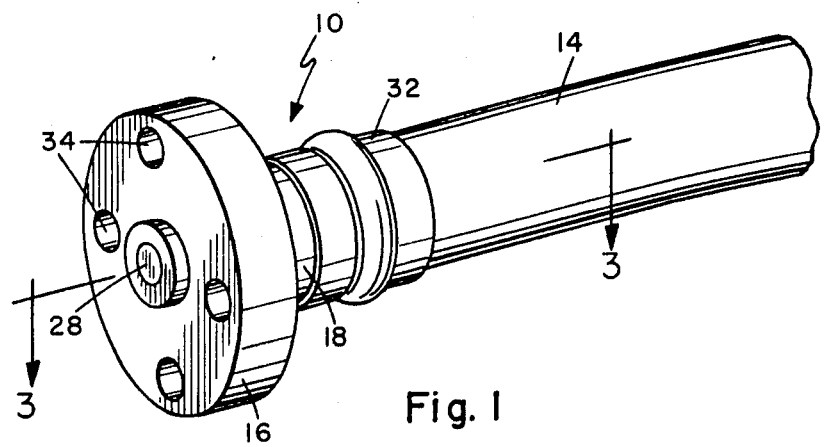
FIG. 1 is a perspective view of the waveguide and termination flange.
Figure 2:
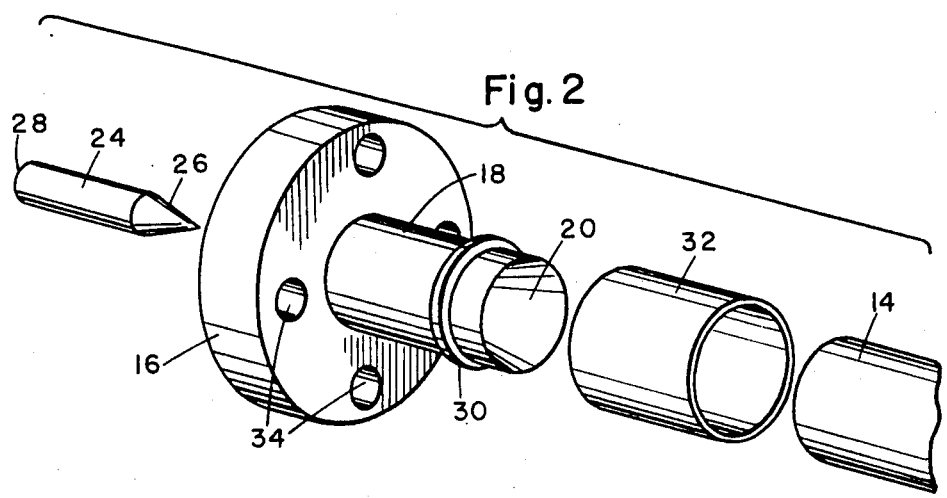
FIG. 2 is an exploded view of the connector.
Figure 3:
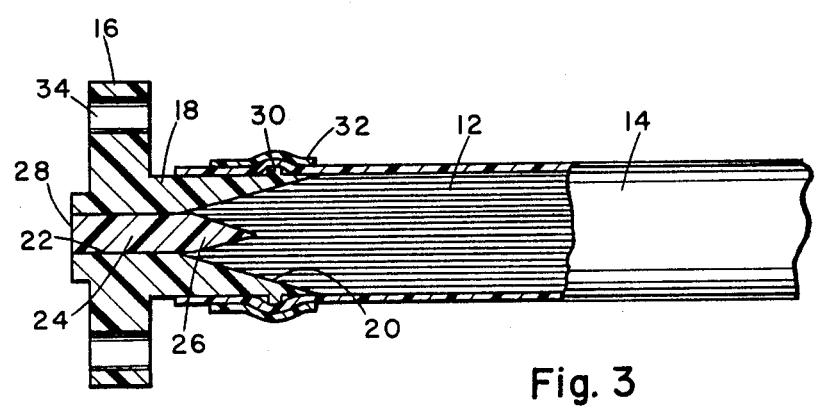
FIG. 3 is a sectional view taken on line 3—3 of FIG. 1.

Referring to the drawings, a waveguide in accordance with the invention is designated generally by the numeral 10 and comprises a flexible cable made up of a bundle of small diameter flexible fibers of a dielectric material 12 bundled together within a flexible sheath or casing 14. The fibers are preferably made of a dielectric material such as polytetrafluoroethylene and are of a suitable diameter such that hundreds of the fibers are bundled together to form the respective waveguide. A sheath 14 of a suitable flexible material such as a woven fiberglass cloth encases the fibers to reduce or prevent radiation loss. Fibers of polytetrafluoroethylene such as herein described have a dielectric constant of 2.2 and a dissipation factor of less than 0.004 at frequencies greater than 1 GHz. The fiber bundle is preferably constructed to have a flexibility so as to minimize the torque or other forces imposed by it on the gimbal.

The waveguide as above described connects or terminates with a brass flange having a generally circular disc-like flange portion 16 with a central cylindrical coaxial member 18 extending outward and formed with a generally conical shaped opening or bore 20 converging to a central coaxial bore 22. A generally cylindrical termination plug 24 preferably formed of a polytetrafluoroethylene material having a generally cylindrical main body portion with a generally wedge or plug conical shaped tip 26 projecting into the conical shaped bore 20 for receiving and coupling wih the ends of the fibers 12. The plug 24 includes a flat or blunt end 28 which is flush with the brass flange. The flange connector can be coupled with other waveguides such as air-filled waveguides in places where flexibility is of no concern. The sheath 14 of the waveguide overlaps the cylindrical extension 18 of the termination coupling and extends over a radial flange or ridge 30 on the cylindrical extension 18. A heat shrink collar 32 fits over the sheath 14 at the overlap of the ridge or flange 30 and clamps the fiberglass sheath 14 into tight connecting engagement with the cylindrical member 18 of the termination flange.

The flange 16 includes suitable holes or bores 34 for receiving bolts, screws or the like for attachment to a waveguide or other suitable coupling.

The lightweight flexible waveguide above described can be connected to the antennae of a missile seeker head or the like for propagation of the radiation to the processing system within the missile without exerting a significant amount of torque on the gimbal. The bundle of fibers and sheaths making up the waveguide are packed with sufficient looseness to permit the necessary flexibility within the waveguide. The waveguide can be constructed with a terminal flange as above described on one or both ends thereof as may be necessary. Other forms of termination flanges may also be utilized as desired.

While we have illustrated and described our invention by means of specific embodiment, it is to be understood that numerous changes and modifications may be made therein without departing from the spirit and scope of the invention as defined in the appended claims.

We claim:

1. A flexible dielectric waveguide for conducting electromagnetic energy in the millimeter region comprising:

an elongated flexible sheath of woven fiberglass materials;

a plurality of flexible polytetrafluoroethylene fibers encased within said sheath; and a termination flange connected to one end of said encased fibers and sheath, said termination flange comprising;

a body member constructed of brass having a generally circular radial flange and a generally cylindrical coaxial extension thereof, said body member having a generally cylindrical through bore terminating at an end of said extension in a generally conical-shaped end for engagement with the ends of predetermined ones of said fibers; and a polytetrafluoroethylene plug of a generally cylindrical configuration mounted within said body member bore, said plug having a conical end engaging the ends of other predetermined ones of said fibers.

2. A dielectric millimeter waveguide comprising:
a flexible sheath;
a plurality of flexible dielectric fibers confined within said sheath, said fibers and said sheath defining a cable; and
a pair of termination flanges each coupled to an opposite end of said cable, wherein at least one of said termination flanges has a tapered face cavity engaging predetermined ones of said fibers and includes a dielectric plug having a wedge-shaped end engaging predetermined ones of said fibers.

3. The waveguide of claim 2 wherein said plug wedge-shaped end extends into said tapered face cavity.

4. The waveguide of claim 3 wherein said fibers and said sheath are respectively constructed of polytetrafluoroethylene and woven fiberglass cloth.

5. The waveguide of claim 4 wherein each of said termination flanges is constructed substantially of brass and each of said plugs is constructed of polytetrafluoroethylene.

6. A flexible dielectric millimeter waveguide comprising:
a flexible cable comprising:
a flexible sheath, and
a plurality of flexible fibers of dielectric material encased within said sheath; and
a termination flange connected to at least one end of said cable, said termination flange comprising:
a rigid body member having a generally circular radial flange portion and a generally cylindrical extension portion extending coaxially from said flange portion, said body member having a generally cylindrical bore extending coaxially through said flange portion and said extension portion, said bore terminating in said extension portion at an end opposite said flange portion is a generally conical-shaped opening, said extension portion having a radial ridge about the exterior thereof adjacent said end with said conical-shaped opening;
a generally cylindrical plug having one end flush with said flange portion and an opposite end being conical-shaped and extending within the region defined by said conical-shaped opening, said plurality of fibers abutting said conical-shaped end of said plug and said conical-shaped opening, said sheath extending about the exterior of said extension portion between said ridge and said flange portion; and
a collar mounted about said sheath overlapping said ridge, said collar securely engaging said sheath with said ridge and extension portion.

7. The waveguide of claim 6 wherein said sheath consists of a woven fiberglass cloth.

8. The waveguide of claim 7 wherein said collar is made of a heat-shrink material.

9. The waveguide of claim 7 wherein said sheath consists of a woven fiberglass cloth, said fibers and plug are made of polytetrafluoroethylene, said body member is made of brass, and said collar is made of a heat-shrink material.

10. The waveguide of claim 6 wherein each fiber is of polytetrafluoroethylene.

11. The waveguide of claim 6 wherein said plug is made of a dielectric material.

12. The waveguide of claim 6 wherein said plug is made of polytetrafluoroethylene.

13. The waveguide of claim 6 wherein said body member is made of brass.

* * * * *